(12) United States Patent
Shillingford et al.

(10) Patent No.: US 12,105,728 B2
(45) Date of Patent: Oct. 1, 2024

(54) EXTENSIBLE DATA OBJECTS FOR USE IN MACHINE LEARNING MODELS

(71) Applicant: DeepSee.ai Inc., Salt Lake City, UT (US)

(72) Inventors: Stephen W. Shillingford, Salt Lake City, UT (US); Wacey T. Richards, Midway, UT (US); Bryan W. Sparks, Lindon, UT (US); Michael Ephraim Kiemel, Lehi, UT (US); Max K. Goff, Madison, MS (US); Eduardo James Sagra, Sandy, UT (US); Ryan W. McQueen, Sandy, UT (US)

(73) Assignee: DeepSee.ai Inc., Salt Lake City, UT (US)

( * ) Notice: Subject to any disclaimer, the term of this patent is extended or adjusted under 35 U.S.C. 154(b) by 180 days.

(21) Appl. No.: 17/475,204

(22) Filed: Sep. 14, 2021

(65) Prior Publication Data

US 2022/0083561 A1  Mar. 17, 2022

Related U.S. Application Data

(60) Provisional application No. 63/077,925, filed on Sep. 14, 2020.

(51) Int. Cl.
| | | |
|---|---|---|
| *G06F 16/25* | (2019.01) | |
| *G06F 16/28* | (2019.01) | |
| *G06F 16/35* | (2019.01) | |
| G06F 40/216 | (2020.01) | |
| G06F 40/30 | (2020.01) | |
| G06N 20/00 | (2019.01) | |

(52) U.S. Cl.
CPC .......... *G06F 16/258* (2019.01); *G06F 16/289* (2019.01); *G06F 16/353* (2019.01)

(58) Field of Classification Search
CPC ..... G06F 16/258; G06F 16/289; G06F 16/353
See application file for complete search history.

(56) References Cited

U.S. PATENT DOCUMENTS

| | | |
|---|---|---|
| 8,683,389 B1 * | 3/2014 | Bar-Yam ............. G06F 16/2264 715/713 |
| 9,235,812 B2 | 1/2016 | Scholtes |
| 10,162,850 B1 | 12/2018 | Jain |
| 10,229,117 B2 | 3/2019 | Cormack |
| 10,412,210 B2 * | 9/2019 | Bjontegard ............. A63F 13/32 |
| 10,489,439 B2 | 11/2019 | Calapodescu |
| 10,534,825 B2 | 1/2020 | Mukherjee et al. |
| 10,614,345 B1 | 4/2020 | Tecuci |
| 10,657,368 B1 | 5/2020 | Edmund |
| 10,726,374 B1 | 7/2020 | Engineer |
| 10,755,045 B2 | 8/2020 | Crouse |
| 10,810,709 B1 | 10/2020 | Tiyyagura |
| 10,848,494 B2 | 11/2020 | Shelton |

(Continued)

*Primary Examiner* — Miranda Le
(74) *Attorney, Agent, or Firm* — PCFB, LLC; Justin K. Flanagan

(57) ABSTRACT

Systems and methods are described herein for creating a data object for each of a plurality of imported unstructured data files. Each data object may expressly include one of the unstructured data files. Preprocessing subsystems and/or machine learning algorithms and subsystems process the data to generate or otherwise identify structured insight features. The system updates each data object to expressly include the structured insight features.

10 Claims, 13 Drawing Sheets

(56) References Cited

U.S. PATENT DOCUMENTS

| | | |
|---|---|---|
| 10,860,849 B2 | 12/2020 | Liu |
| 10,877,924 B2 | 12/2020 | Wang |
| 10,936,974 B2 | 3/2021 | Chaudhari |
| 2013/0212479 A1* | 8/2013 | Willis ............... G06Q 10/10 715/736 |
| 2015/0026120 A1* | 1/2015 | Chrapko ........... G06F 16/9024 707/748 |
| 2015/0169593 A1 | 6/2015 | Bogdanova |
| 2015/0309714 A1* | 10/2015 | Blyumen ........... G06F 3/04842 715/753 |
| 2017/0235466 A1* | 8/2017 | Tanwir ............... G06F 3/0481 715/738 |
| 2017/0235848 A1* | 8/2017 | Van Dusen ........ G06Q 30/0201 705/12 |
| 2018/0089591 A1* | 3/2018 | Zeiler ................. G06F 3/048 |
| 2019/0114370 A1* | 4/2019 | Cerino ................ G06F 40/14 |
| 2019/0124101 A1 | 4/2019 | Cobb |
| 2019/0138580 A1 | 5/2019 | Taleghani |
| 2019/0156222 A1* | 5/2019 | Emma ................. G06N 5/041 |
| 2020/0272864 A1* | 8/2020 | Faust ................. G06F 18/214 |
| 2020/0293933 A1* | 9/2020 | Ghosh .............. G06F 18/24147 |
| 2020/0394708 A1* | 12/2020 | Cella ................ G06F 16/27 |
| 2021/0183498 A1* | 6/2021 | Kalafut .............. G16H 50/20 |

\* cited by examiner

EXTENSIBLE DATA OBJECTS FOR USE IN MACHINE LEARNING MODELS

RELATED APPLICATIONS

This application claims benefit of and priority to U.S. Provisional Patent Application No. 63/077,925 filed on Sep. 14, 2020, titled "Extensible Data Objects for use in Machine Learning Models," which application is hereby incorporated by reference in its entirety. Many of the systems, methods, and concepts described herein can be utilized in conjunction with the systems, methods, and concepts described in U.S. patent application Ser. No. 17/364,698 filed on Jun. 30, 2021, titled "Rules-Based Template Extraction," which application is also hereby incorporated by reference in its entirety to the extent it is not inconsistent wherewith, although no priority is claimed thereto.

TECHNICAL FIELD

This application generally relates to data structures, visualization systems, and data preprocessing for machine learning.

BRIEF DESCRIPTION OF THE DRAWINGS

The written disclosure herein describes illustrative embodiments that are nonlimiting and non-exhaustive. This disclosure references certain of such illustrative embodiments depicted in the figures described below.

DETAILED DESCRIPTION

Figure 1:
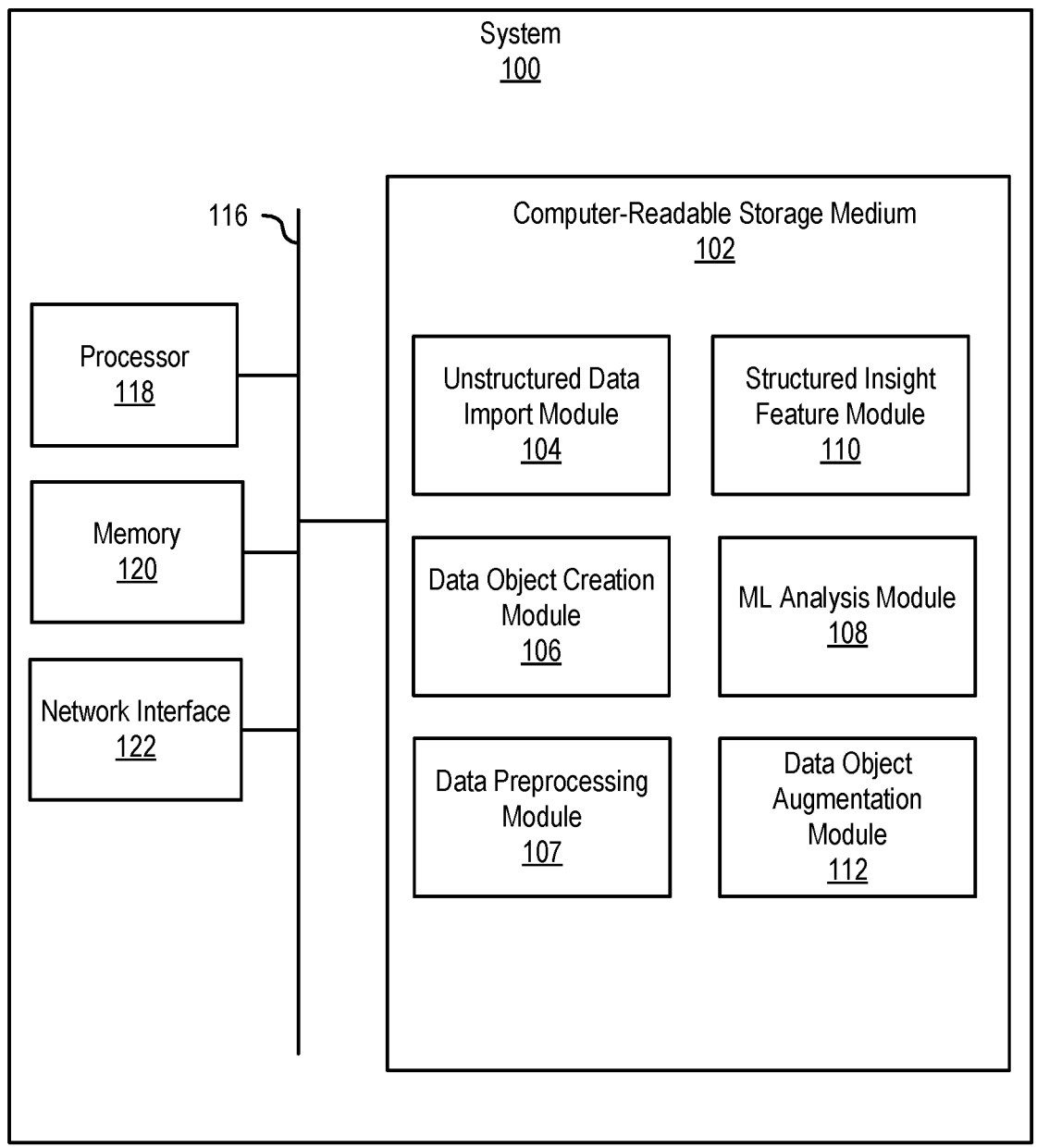
FIG. 1 illustrates an example of a computer system for implementing the various processes and methods described herein, according to various embodiments.

Machine learning and other artificial intelligence technologies are increasingly utilized to process, extract information from, and compare large datasets. Like many other industries, financial and banking institutions may benefit from the increased use of machine learning and other artificial intelligence technologies. Many machine learning systems, such as those using deep learning or trained neural networks, are trained to perform specific tasks with respect to input datasets. Once trained, a machine learning system may function as a "black box" in the sense that neither the original programmers nor the trained machine learning algorithm itself can explicitly articulate in exact detail the manner in which the specific tasks are performed. That is, a trained machine learning model used by a computing system may not be interpretable or explainable, as understood by persons of skill in the art.

Additionally, the datasets provided as inputs into a machine learning model may be sufficiently complex and/or so large that each dataset is itself a black box, at least with respect to an individual human's ability to visualize or comprehensively understand all of it. Preprocessing of complex and large datasets may facilitate increased performance and/or be necessary for the machine learning model to perform its task.

Many businesses and other entities may be hesitant to rely on the accuracy of systems utilizing machine learning and other artificial intelligence technologies given the inability to explicitly interpret or explain how exactly the machine learning model implements the specific task. This may be especially important in the context of demonstrating accuracy to regulatory agencies and/or satisfying governmental, internal, or third-party compliance requirements and standards. In many instances, the accuracy of a trained machine learning model may be demonstrated by example. For example, training data or data specifically curated to demonstrate the functionality of a machine learning model may be input into a trained machine learning model. The accuracy of the machine learning model may be demonstrated by the accurate performance of a specific task by the machine learning model when compared with a different processing approach (e.g., manual human processing or interpretable code processing).

As a simple example, the ability of a machine learning model to accurately identify animal names in pictures of animals may be demonstrated by example. That is, images of animals may be input into the machine learning model and the identification results can be compared with the results of a human-based identification of the same images. Despite the inability to explicitly interpret how the machine learning algorithm is identifying the animals, the demonstrated accuracy of a machine learning model may be sufficient to assuage the fears, concerns, or initial distrust of potential users.

In extremely large datasets with more difficult tasks, the black-box nature of the datasets themselves gives rise to some hesitancy or distrust with the results of a system utilizing machine learning and/or other artificial intelligence technologies. For example, in some instances, the completeness of a dataset and/or accurate preprocessing of a dataset may be critical to the accuracy of a machine learning model. Preprocessing of a dataset may include any of a wide variety of processing steps that are beyond the scope of this patent application but are well understood by those of skill in the art with respect to a specific machine learning model.

Without limitation, examples of possible data preprocessing can be lumped into the broad categories of data cleansing, data editing, data reduction, and data wrangling. Data preprocessing may include, for example, and without limitation: identifying, correcting, and/or removing inaccurate data; validating data quality, accuracy, completeness, consistency, and/or uniformity; data parsing; data transformation; data deduplication; normalization, exclusion of outliers, and aggregation of related data; mapping data from a raw or first format to machine-readable or second format; etc.

In many instances, the preprocessed data that is provided as an input into a system utilizing machine learning or another artificial intelligence technology directly impacts the results or output of the system. Accordingly, even if, for example, a trained machine learning model is demonstrated or proved to be accurate (e.g., trusted) by a business, a regulatory body, a compliance officer, or other entity, the output of the system may still be suspect if the preprocessed data is not demonstrably complete and accurate.

This disclosure provides systems, methods, a new extensible data object type, visualization systems, and graphical user interfaces that facilitate and provide for the validation, explainability, visualization, and auditability of the data provided as an input into a system that uses a machine learning model or another artificial intelligence algorithm. Many of the systems and methods described herein utilize an extensible data object approach. According to various embodiments, each document or other data element in a dataset may be represented by a unique data object.

For example, for a dataset that includes a plurality of unstructured documents, a system may create an extensible data object for each unstructured document. As the unstructured documents are processed as part of data preprocessing, each of the extensible data objects may be augmented to include a structured version together with the unstructured document. With further preprocessing, each extensible data object may be further augmented to include metadata identifying relationships between each respective document.

Depending on the type of data in the dataset, each extensible data object initially includes the raw data element (e.g., a document, a figure, a chart, a value, a table, etc.). As the dataset is processed (e.g., as part of a data preprocessing step in an artificial intelligence system), each extensible data object may be augmented or otherwise modified to further include processed or structured data corresponding to the underlying raw data element, characterizations of the data element, categorizations of the data element, interpretations of the data element, identified attributes of the data element, relationships with other data elements, prior versions of the data element, and/or other information or "structured insight features" identified during data preprocessing, as described in greater detail below.

In some embodiments, each extensible data object may include information identifying and tracking each modification and addition to the extensible data object. For example, the tracking information may identify which stage of preprocessing, which preprocessing subsystem, or which individual authorized or caused the additions, modifications, or augmentation to the extensible data object.

Each extensible data object may include structured insight features of the unstructured source data (e.g., the raw data). Structured insight features may be, for example, identified, discovered, calculated, or otherwise developed by processing or examining the unstructured source data and/or any previously identified structured insight features.

Various embodiments of systems and methods described herein generate data objects that allow for feature-engineered data to be stored in a structured format alongside the unstructured source data. These data objects provide a flexible and extensible model for delivering unstructured data and structured, feature-engineered data to a machine learning-based algorithm or subsystem for processing and/or analysis.

Feature engineering of unstructured data generally comprises using domain knowledge of the unstructured data to extract features from the raw data that can be used to guide or inform a machine learning-based algorithm, analysis, or subsystem. In some cases, the output of one machine learning-based subsystem or analysis generates features that are useable by another machine learning-based subsystem or analysis. Features are generally "structured" in that the features are stored in a searchable or computer-readable format. Furthermore, features generally provide insight or a different view of the underlying unstructured data that may not be readily apparent at first glance, especially to a computer or a non-expert. Throughout this disclosure, the term "structured insight feature" is used to describe computer-readable formats of features, attributes, insights, and other characteristics of unstructured data. Some insights may be provided via automated or semi-automated processing systems (e.g., data preprocessing prior to machine-learning ingestion). In some instances, a subject matter expert (e.g., a human reviewer) may manually provide a structured insight for inclusion in the extensible data object. Such insights may be referred to as subject matter expert insights.

According to various embodiments, a system may receive unstructured source data. The system may also receive an array of data preparation functions that, for example, direct a machine learning-based analysis subsystem to generate structured data that provides unique insights into or views of the unstructured source data. The system may create a data object that includes the unstructured source data in its entirety. The system, through a machine learning-based analysis, may identify one or more structured insight features associated with the unstructured data. As an example, the machine learning-based analysis may extract structured text from the unstructured source data, calculate a value based on the unstructured source data, generate a graph of the unstructured data, or otherwise generate a structured insight feature.

The system may then modify the data object to further include the structured insight feature identified through the machine learning-based analysis. The system may perform additional machine-learning-based analyses on the data object in parallel and/or sequentially to identify additional structured insight features. Different machine-learning-based analyses may be utilized to identify various types of structured insight features. Some machine-learning-based analyses may analyze only the original unstructured source data to identify new structured insight features to be added to the data object. Other machine-learning-based analyses may analyze the original unstructured data in conjunction with one or more existing structured insight features to identify new structured insight features to be added to the data object. Other machine-learning-based analyses may examine only one or more of the existing structured insight features (i.e., and not the unstructured source data) to identify new structured insight features to be added to the data object.

Since each machine learning-based analysis may result in an updated data object with new structured insight features, iterative or repeated analyses using the same machine learning-based analysis subsystem may result in additional or refined structured insight features. Each machine learning-based analysis subsystem or subroutine may receive the data object in its current form (e.g., with the unstructured source data and any previously identified structured insight features). Each machine learning-based analysis subsystem or subroutine may also receive or inherently include data preparation functions for the unstructured source data and/or functions for interrogating one or more of the existing structured features stored within the data object. The system may then modify or update the data object after the analysis to further include any newly identified structured insight features.

The system is easily adaptable to accommodate updated or new analyses relying on newly developed machine learning-based models at any time. Since the data object includes the original unstructured source data and all previously identified structured insight features, new analyses may be performed at any time to further augment the data object with new structured insight features.

The term "structured insight features" is used broadly herein to describe a wide array of information describing, summarizing, extracted from, calculated from, derived from, tagging, or otherwise associated with the unstructured source data. The types of structured insight features that are relevant to specific unstructured source data may depend on the type of unstructured source data. The following examples illustrate possible structured insight features that may be included within a data object associated with specific types of unstructured source data. However, it should be recognized that one advantage offered by the data object described herein is the ability to store the unstructured source data and any previously identified insight features in a manner that makes it readily accessible to newly developed machine learning-based analysis models that generate new structured insight features not previously possible or not previously recognized as beneficial.

In one example, the unstructured source data is an image of a painting. A data object may be created that includes the image and, initially, no structured insight features. A first machine learning-based analysis may determine the name of the creator of the painting based on, for example, signature extraction, brushstroke analysis, color composition comparison, identification of the painting itself, or the like. The name of the painter may be stored in the data object as a structured insight feature. Thus, the data object may thereafter be queried (e.g., through an API or function call) and return the name of the painter. Subsequent analyses, including machine learning-based analyses, may identify other insights, features, characteristics, and/or attributes of the painting that may each be stored in the data object as a structured insight feature that can be retrieved, cataloged, queried, or otherwise made accessible to other systems and/or analyses.

For example, structured insight features may identify the colors used in the painting, the time period during which the painting was created, the primary color of the painting, brushstroke analysis, paint materials used, the medium of the painting, and/or the like.

In another example, the unstructured source data may be a PDF with graphs, tables, images, and/or text. Various machine-learning-based analyses may be utilized to extract and store the graphs, tables, and images as separate, structured insight features. Those structured insight features may in turn be analyzed using machine learning-based analyses particularly relevant to the type of structured insight feature in question. For example, a machine learning-based analysis based on machine learning models for analyzing graphs may be used to further analyze the structured insight features containing graphs.

By initially extracting the graphs out of the PDF (or by extracting pointers to identify the locations of the graphs in the unstructured source data), the machine learning models specifically developed to analyze graphs can be efficiently used to analyze graphs without attempting to analyze the entire unstructured source data PDF document. Furthermore, parallel analyses of the structured insight features that include extracted graphs, extracted tables, and extracted images may be performed using different task-specific machine learning-based analysis subsystems.

Various machine learning-based analysis subsystems may be utilized to identify specific names, contract terms, values, summations, calculations, and/or other specific attributes of the text in the unstructured source data PDF document. Each of the extracted, calculated, derived, or otherwise identified attributes of the PDF document may be stored in the data object as a structured insight feature.

In various examples, structured insight features may include the raw text (e.g., text without images, graphs, tables, etc.) of the unstructured source data. A structured insight feature may include ASCII-encoded, HTML-encoded, and/or XML-encoded versions of the unstructured source data. A structured insight feature may identify text that was bolded, italicized, underlined, colored, shaded, enlarged, highlighted, or otherwise emphasized with respect to the rest of the text in the unstructured source data. A structured insight feature may identify the formatting or layout of the unstructured source data. A structured insight feature may identify the language of text within the unstructured source data. A structured insight feature may include translations of all or portions of the text within the unstructured source data.

A structured insight feature may summarize or include a list of keywords found within the unstructured source data. A structured insight feature may include a list of words determined to be important or of particular relevance by a machine learning-based analysis model. A structured insight feature may include page and line numbers of words in the unstructured source data determined to be important or of particular relevance by a machine learning-based analysis model. A structured insight feature may include X, Y coordinates of words, images, graphs, figures, numbers, or tables in the unstructured source data that are determined to be important or of particular relevance by a machine learning-based analysis model.

In some examples, a machine learning-based analysis may be used to add a structured insight feature to a data object that categorizes the unstructured source data. According to various embodiments, a data object may include structured insight features associated with the entire unstructured source data or an identified subset or portion of the unstructured source data. In various examples, a data object may include structured insight features that reference external content or sources (e.g., URL links or references to external documents), identify a sentiment or tone of the unstructured source data, identify frequently used words or phrases, identify seldom-used words or phrases, identify target words or phrases (e.g., a whitelist or blacklist), or the like.

In some examples, a machine learning-based analysis may be used to identify exogenous data correlated to specific portions of the unstructured source data associated with news, announcements, dates, expirations, conversions, calculations, contract terms, regulatory filings, financial statements, triggering events, and the like. Various machine-learning-based analyses of a corpus of unstructured source data may be used to generate a plurality of data objects that each include the unstructured source data of a contract and various structured insight features that each identify specific terms of each underlying contract. For instance, each data object may include various structured insight features that identify a contract date, coupon payment terms, day calculations, holiday exceptions, average prices, intermediate calculation values, and/or other information for determining when and how the terms of each contract were or should be fulfilled.

The data object is frequently described herein as expressly including the unstructured source data and any identified structured insight features. However, it is appreciated that due to data bandwidth, transmission, and/or storage limitations, the data object may instead include pointers to the stored location(s) of the unstructured source data and/or any previously identified structured insight features. Furthermore, any of a wide variety of technical implementations of the data object are possible. The data object may be embodied as an extension of a suite of APIs, library functions in a particular programming language (e.g., Python), databases (e.g., SQL databases), and/or by leveraging any of a wide variety of programming languages or data structures such as arrays, stacks, structs, linked lists, trees, graphs, hash tables, container objects, and the like.

According to various embodiments described herein, the processing of unstructured source data includes multiple analysis steps (e.g., machine learning-based analyses) that each operates to augment a data object encapsulating the unstructured source data. Each subsequent analysis of the unstructured source data and/or previously identified structured insight features results in the identification of additional structured insight features that can be associated with the unstructured source data and stored in the updated data object. The number of processing or analysis steps can be updated or changed any time that a new machine learning-based model is developed to ascertain new structured insight features.

In various embodiments, the data object can be considered an extensible data store of the unstructured source data and all previously identified structured insight features. Previously identified structured insight features are accessible to and may be used by subsequent machine-learning-based analyses to identify new structured insight features. The unstructured source data remains central throughout the process and is either expressly included in the data object or a pointer identifies a location where the unstructured source data is accessible. Furthermore, structured insight features that are identified through machine-learning-based analyses or other processes are not independently stored and managed. Rather, all identified structured insight features are stored (expressly or via pointers) within the data object in association with the unstructured source data.

As an example, a data scientist may be tasked with preparing a corpus of unstructured data for machine learning-based analysis. The data scientist may import each file (e.g., each document) of the unstructured data into the system. The system may create a data object for each file upon import. In some examples, each data object may also include a collection of data preparation derivatives or parameters to facilitate machine learning-based analysis. In other examples, data preparation derivatives or parameters are stored independent of the data object and fed as variables or controls into each different machine learning-based analysis subsystem.

A particular machine learning-based analysis subsystem may benefit by being informed of the terms, weights, and/or biases associated with a particular file and/or of the corpus of files as a whole. Input from or analysis by a subject matter expert (SME) may result in the identification of important details, terms, weights, biases, or other information associated with a particular file imported into the system and/or the entire corpus of files. Information from the SME may be stored in one or more of the data objects in association with one or more of the imported unstructured source files and used to inform, direct, or guide a subsequent machine learning-based analysis. The SME may be a human in some instances.

As an example, an SME may identify a corpus of documents as being associated with financial reports useful for post-trade reconciliation. The SME may further identify a formatting layout of the financial reports as conforming to a particular standard. These SME insights may be associated with the unstructured source data as structured insight features within a data object. The SME insights may not be immediately useful or stored with an immediate purpose in mind. Subsequent SME insights may be provided by other SMEs that have different skill sets. For example, an accountant may provide SME insights that are different from those provided by an attorney, and a biochemist may provide SME insights that are different from those provided by a medical doctor. The data object may store the SME insights provided by the accountant, attorney, biochemist, and medical doctor in association with the unstructured source data.

The system may analyze the data object using any number of machine learning-based analysis subsystems (sequentially or in parallel) and some of the machine learning-based analysis subsystems may be informed by some or all of the SME insights. The various embodiments of data objects described herein that include the unstructured source data and identified structured insight features, including SME insights, greatly expedites and improves the data scientist's "feature engineering" abilities.

As another example, an engineer may be tasked to provide a visualization of a corpus of unstructured source data (e.g., via a dashboard). The system generates a unique data object for each imported file or document of the unstructured source data. SME insights and/or machine learning-based analyses generate structured insight features that are stored within each data object in association with the underlying unstructured source data from which they are derived. Dynamic visualizations of the structured insight features may be displayed, visualized, or otherwise called up for any subset of the unstructured source data.

If a specific structured insight feature is not available, a machine learning model may be developed to generate the target structured insight feature. The machine learning model may use the unstructured source data as an input along with one or more of the previously identified structured insight features. The data objects, including the unstructured source data and any previously identified structured insight features, are fed into the newly developed machine learning-based subsystem to generate the target structured insight features, which are added to each respective data object.

In some instances, by building machine learning models that utilize existing structured insight features, and not just the unstructured source data, the machine learning models can operate more efficiently, thereby reducing the time and/or compute power required to generate the target structured insight features. For example, a corpus of financial documents may include documents relating to real estate transactions, commodity transactions, and financial instrument exchanges. Previous machine-learning-based analyses may have been performed to generate structured insight features for displaying various graphs and attributes of the financial documents. A request to display a particular correlation of real estate transactions and commodity transactions may necessitate additional analyses.

In a traditional system, a machine learning model may be developed to analyze the entire corpus of financial documents to identify the information needed to display the requested correlation. However, by using data objects that include previously identified structured insight features associated with the unstructured source data, machine learning models can be developed that leverage the structured knowledge already available and stored in each data object (expressly or as a pointer).

As a basic example, the machine learning model may be informed by a structured insight feature that identifies a category and format of the unstructured source data in each data object. Even this basic information may be used by the machine learning model to expedite the analysis and more quickly provide the new information needed to display the requested correlation.

Systems and methods are described below for creating, generating, and augmenting extensible data objects to represent a dataset of unstructured data elements. Additionally, various systems and methods for generating, rendering, and displaying graphical user interfaces to visualize extensible data objects of large datasets of unstructured data are also described below.

In various examples, a system may include a data import module to receive a dataset with a plurality of unstructured data elements. A data object creation module may create an extensible data object for each of the unstructured data elements in the dataset. Thus, each extensible data object includes one of the unstructured data elements and every unstructured data element may be represented by one extensible data object. Modifications to an underlying unstructured data element may result in an updated or new version of an extensible data object with insights identifying the updates or version creation.

A structured insight feature module may receive a first structured insight feature associated with the first unstructured data element of a first extensible data object. For example, a processing subsystem, a data preprocessing subsystem, a machine learning-based subsystem, or another entity or person may provide the first structured insight feature. Any number of structured insight features may be generated, identified, discovered, or otherwise received for association with each respective extensible data object.

The structured insight feature module may augment each respective extensible data object to include the structured insight features associated therewith. Some of the structured insight features may be relationship insight features that define, characterize, or otherwise describe a relationship between two or more unstructured data elements. The principles, concepts, and ideas described herein may be practiced using alternative or variations of the systems described herein.

Some of the infrastructure that can be used with embodiments disclosed herein is already available, such as general-purpose computers, computer programming tools and techniques, digital storage media, virtual computers, virtual networking devices, and communications networks. A computer may include a processor, such as a microprocessor, microcontroller, logic circuitry, or the like. The processor may include a special purpose processing device, such as an ASIC, PAL, PLA, PLD, Field Programmable Gate Array, or another customized or programmable device. The computer may also include a computer-readable storage device, such as non-volatile memory, static RAM, dynamic RAM, ROM, CD-ROM, disk, tape, magnetic, optical, flash memory, or another computer-readable storage medium.

Aspects of certain embodiments described herein may be implemented as software modules or components. As used herein, a software module or component may include any type of computer instruction or computer-executable code located within or on a computer-readable storage medium. A software module may, for instance, comprise one or more physical or logical blocks of computer instructions, which may be organized as a routine, program, object, component, data structure, etc., that perform one or more tasks or implement particular abstract data types.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1 illustrates an example of a computer system 100 for implementing the various processes and methods described herein, according to various embodiments. As illustrated, the system 100 may include a bus 116 that connects a processor 118, a memory 120, and a network interface 122 to a computer-readable storage medium 102, such as a non-transitory computer-readable storage medium. The computer-readable storage medium 102 may include an unstructured data import module 104 to receive unstructured data, such as a corpus of individual unstructured files or documents.

The computer-readable storage medium 102 may include a data object creation module 106 to create a data object, as described herein, for each imported unstructured data file or document. A data preprocessing module 107 may process the data within a dataset to identify insights associated with at least some of the data elements in the dataset. A machine learning-based analysis module 108 may provide an interface to deliver data objects to external machine learning-based analysis subsystems, SME insight input subsystems, and/or internally stored machine learning-based analysis subsystems. A structured insight feature module 110 may receive the structured insight features generated by machine learning-based analysis subsystems and/or SMEs. The data object augmentation module 112 augments (e.g., updates, revises, edits, changes, etc.) the data object to include the unstructured source data as originally imported along with each subsequently generated structured insight feature.

In various embodiments, the use of extensible data objects can be used to facilitate audits and/or root cause analysis of insights added or associated with extensible data objects, new versions of underlying raw data, and/or other modifications to an underlying data source. For example, in financial due diligence, the systems and methods described herein may be specifically tailored to support every type of file or data type used by the financial institution. For example, an extensible data object can be created for each type of booking system file, individual trade files, loan agreements, and supporting files associated with trades. Machine learning algorithms and subsystems, other artificial intelligence-based systems, processing systems, data preprocessing systems, subject matter experts, and/or the like may process or otherwise review the data to identify structured insights, as described herein.

For example, some structured insights may include key elements extracted from individual agreements. Key elements extracted from an agreement can be compared or reconciled with respect to comparable data extracted from a booking system file. If errors or discrepancies are identified, the files may be amended by creating new extensions or updates to the original unstructured data element. A new extensible data object may be created from the modified unstructured data element and identified as a new version (e.g., version 2). Successful reconciliation using version 2 of the extensible data object can be added as a structured insight to the extensible data object(s).

Figure 2:
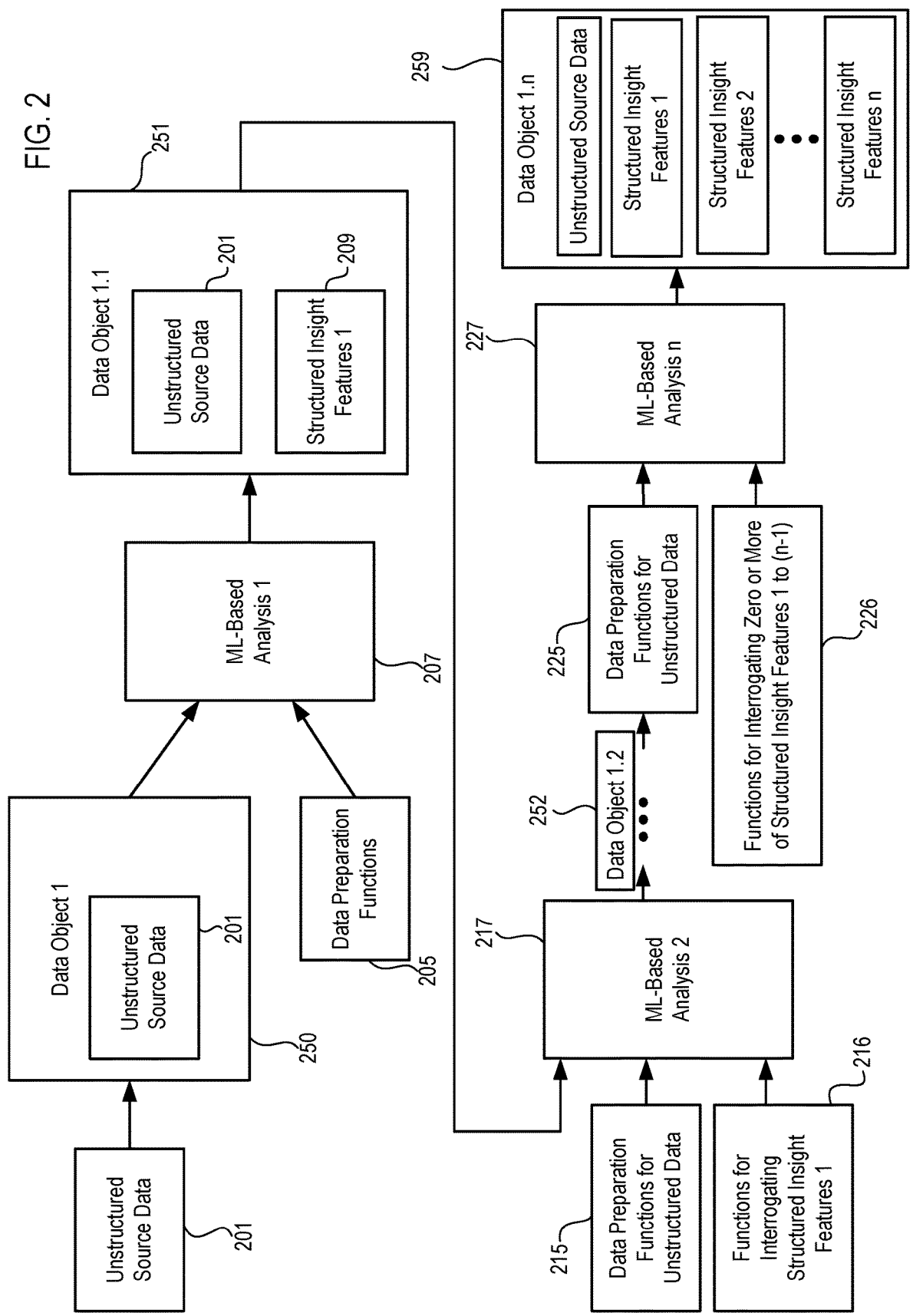
FIG. 2 illustrates a data object with unstructured source data modified after sequential machine-learning-based analyses, according to one embodiment.

FIG. 2 illustrates a data object 250 generated for an unstructured source data element 201. The data object includes (e.g., explicitly or as a pointer) the unstructured source data 201. A machine learning-based analysis subsystem 207 may processes the data object 250. The machine learning-based analysis subsystem 207 may utilize data preparation functions 205. The machine learning-based analysis subsystem generates identifies, extracts, produces, or otherwise outputs structured insight features 209. The structured insight features 209 are added to the data object along with the unstructured source data (again, explicitly added or via a pointer to a data location) to generate data object 1.1 251.

Additional data preparation functions 215 and/or functions for interrogating structured insight features 216 may be utilized by an additional machine-learning-based analysis subsystem 217 to generate a data object 252 that includes additionally identified structured insight features (not shown due to space constraints in the drawing). Any number of additional data preparation functions for the unstructured data 225 and/or functions to interrogate the existing structured insight features 226 may be used by any number of additional analysis subsystems (e.g., non-machine learning-based subsystems and/or machine-learning-based analysis subsystem(s) 227). A data object 1.n 259 may be generated that includes (e.g., explicitly or by reference) the unstructured source data and any number of structured insight features 1-n.

Figure 3:
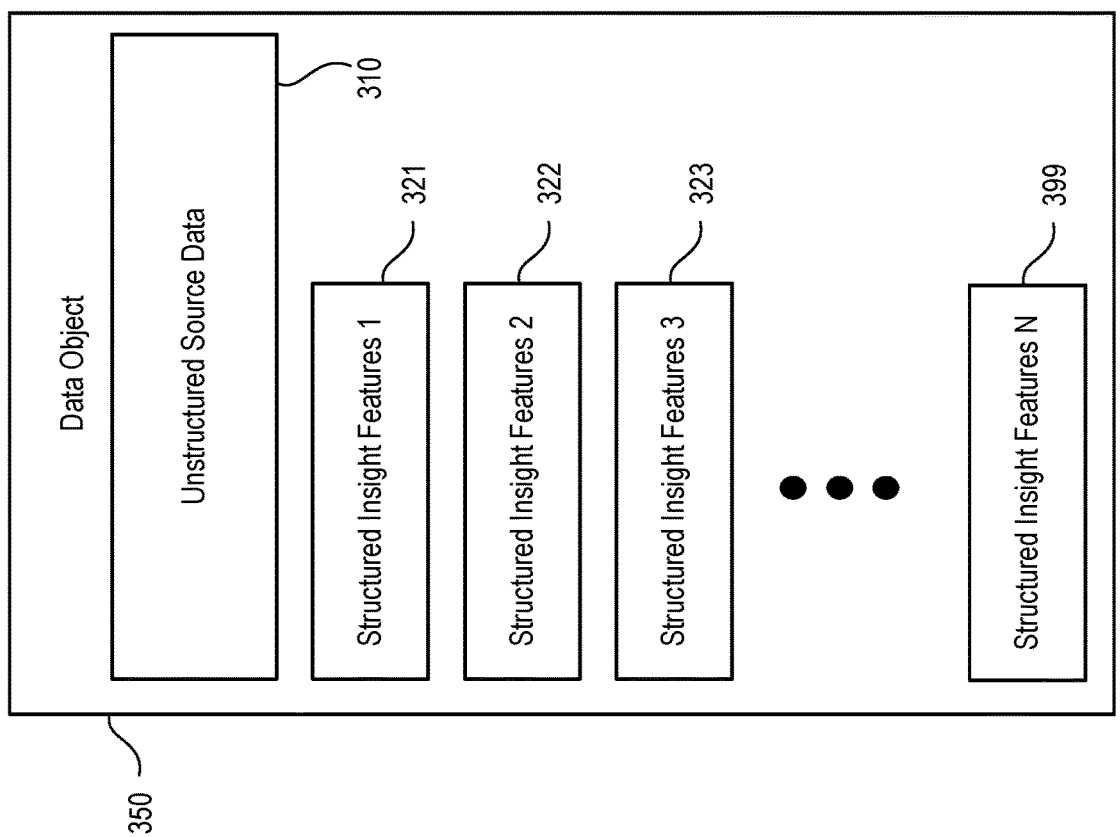
FIG. 3 illustrates a general example of a data object that includes an unstructured source data element and N structured insight features, according to various embodiments.

FIG. 3 illustrates a general example of a data object 350 that includes an unstructured source data element 310 and N structured insight features 321, 322, and 323 through 399, according to various embodiments.

Figure 4:
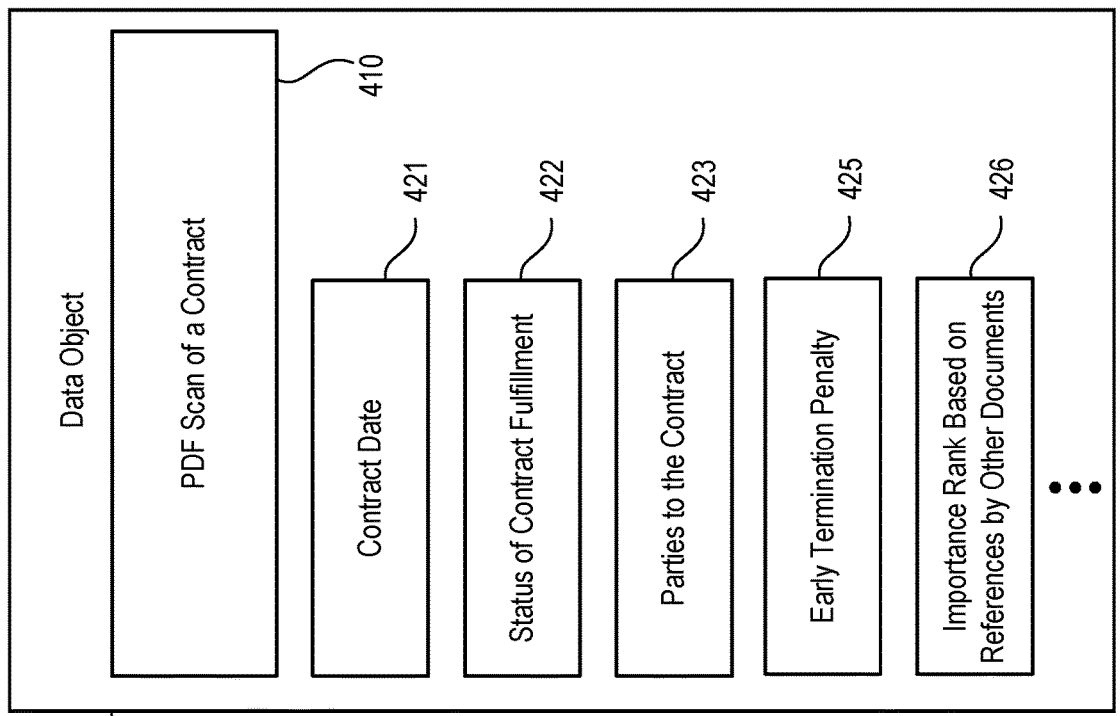
FIG. 4 illustrates a specific example of a data object that includes an unstructured PDF scan of a contract and structured insight features identifying specific terms of the contract.

FIG. 4 illustrates a specific example of a data object 450 that includes an unstructured PDF scan of a contract 410 and structured insight features identifying specific terms of the contract. Each of the structured insight features may have been provided by a human SME or as the output of computerized analysis, such as the output of a machine learning-based analysis. In some embodiments, a single machine learning-based analysis may be used to generate multiple distinct structured insight features.

Some of the structured insight features, such as the contract date 421 and the parties to the contract 423, may be permanent and unchanging. Other structured insight features may be determined by a machine learning-based analysis in consideration of other external parameters or information. For example, the status of contract fulfillment 422 may change from "unfulfilled" to "fulfilled" based on the fulfillment of the contract. Similarly, the early termination penalty 425 may not be relevant or may change once the contract is fulfilled or terminated by other means. In addition, the system may update the importance rank 426 of the contract each time that the system identifies another data object with an unstructured document that references or otherwise refers to this particular contract.

As another specific example, a system may utilize extensible data objects to track each data source in the insurance industry. For example, extensible data objects may be used to track each different data source used in the policy issuance and lifecycle events. Each extensible data object may be based on a central original data source (e.g., an unstructured data source) and the orbiting satellite of structured insight features may be modified an updated throughout the lifetime of the policy.

In a specific example, they system may ingest client email correspondence and run a sentiment analysis against the emails to determine the tone of the client's email when auditing the policy to ensure it matched their request. The extensible data object may be centered around the unstructured email document (which may already be machine-readable, but not processed, interpreted, or term-extracted). Extracted sentiment analysis may result in the augmentation of the extensible data object to include structured insight features identifying the sentiment(s) associated with the underlying or central email.

In some embodiments, the email may be transformed into a new document format that is stored as a structured insight feature or as a new extensible data object with a relationship insight feature connecting it back to the original extensible data object. The new document format of the email used to form the new, related extensible data object may be designed to, for example, minimize the punctuation and capitalization and allow the sentiment to be measured. The analysis may result in new versions of the email and/or structured insights that can be used in subsequent filtering and processing of the data by other systems and persons.

Figure 5:
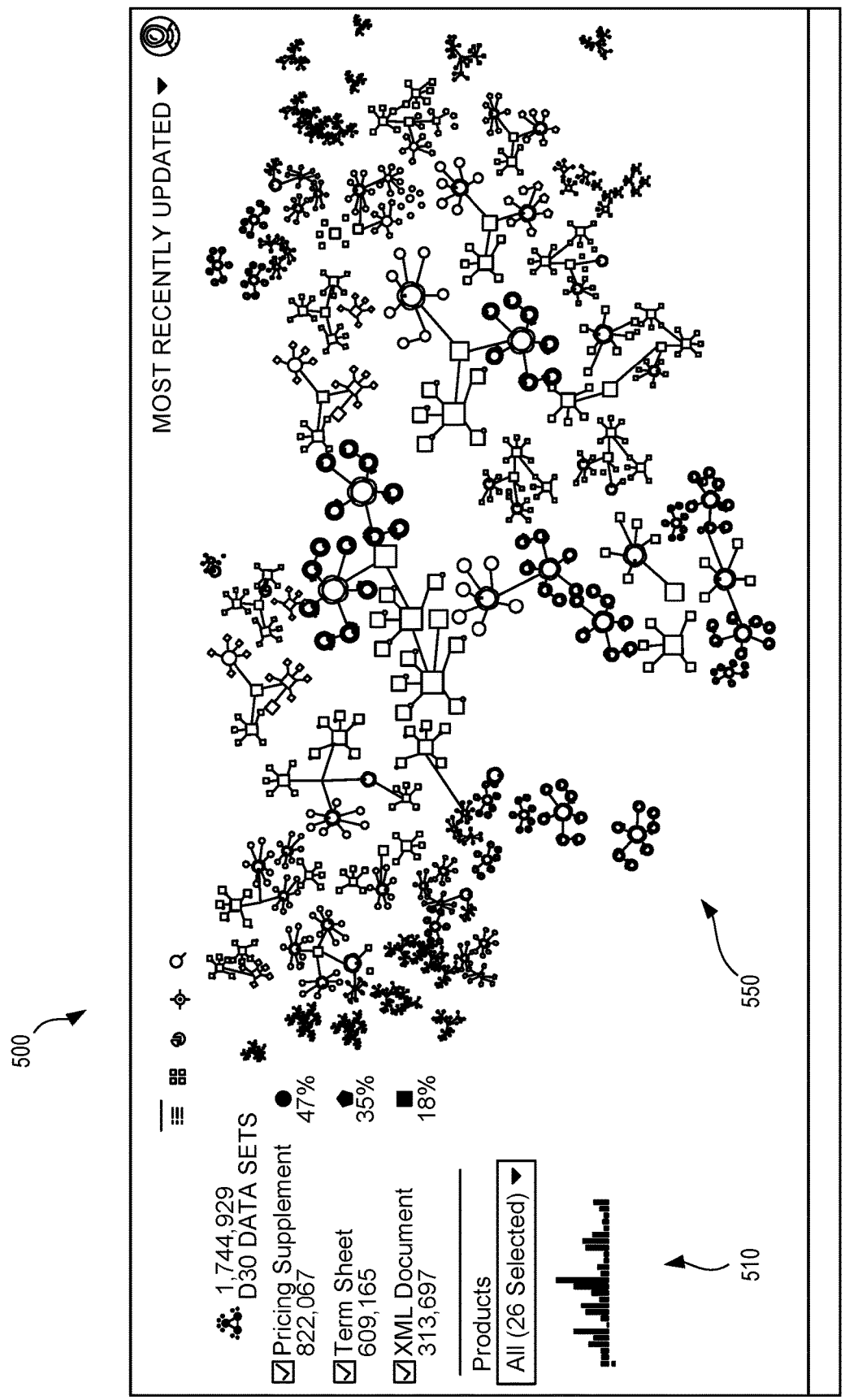
FIG. 5 illustrates a graphical user interface with a visual representation of a plurality of extensible data objects for a dataset, according to one embodiment.

FIG. 5 illustrates a graphical user interface with a visual representation 500 of a plurality of extensible data objects 550 for a dataset, according to one embodiment. A data type menu 510 allows a user to select one or more data types. The selection of a specific data type or a subset of data types can be used to filter the number of extensible data objects 550 that are shown in a primary or main panel or region of the graphical user interface.

Figure 6:
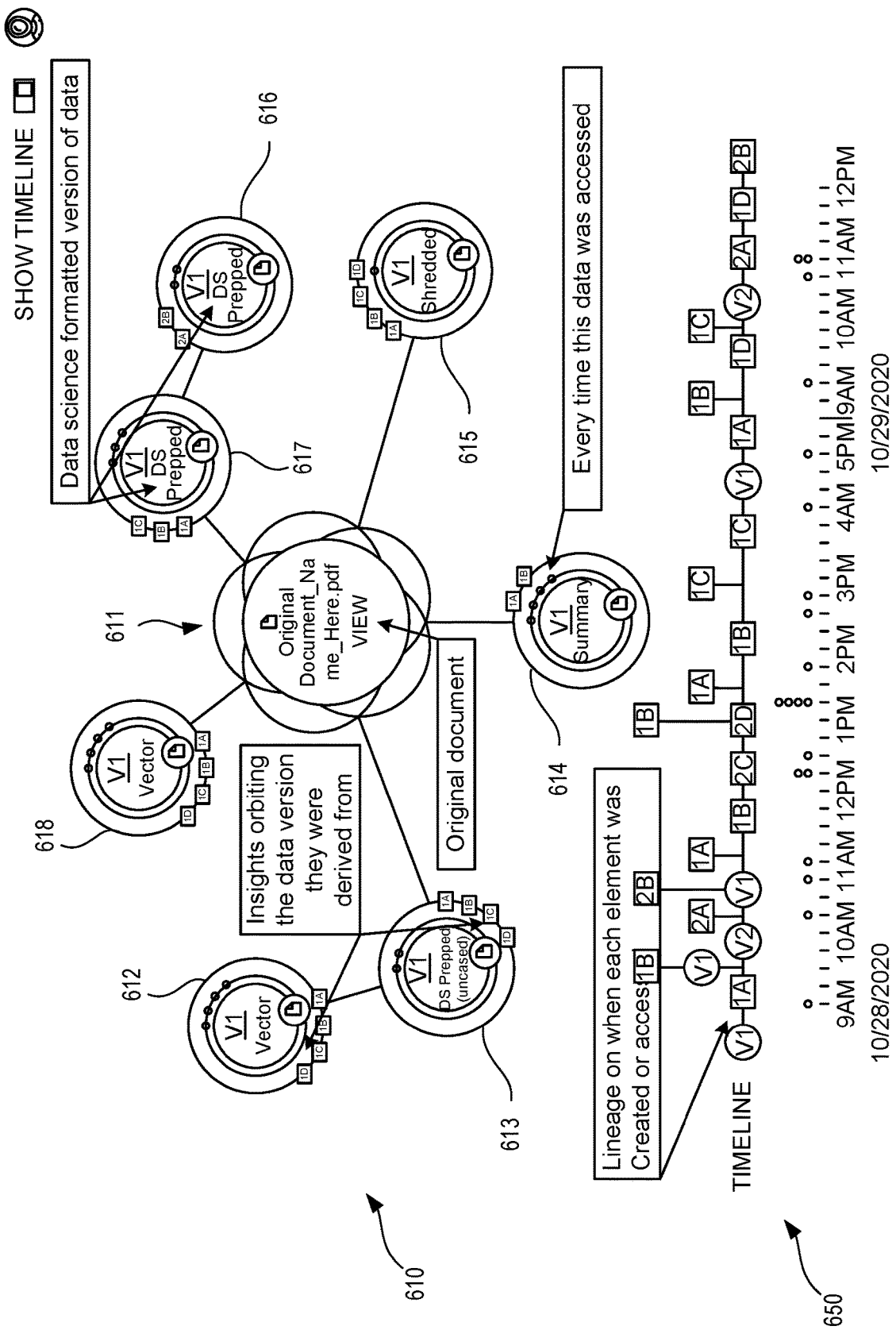
FIG. 6 illustrates a graphical user interface with a visual representation of a single extensible data object, according to one embodiment.

FIG. 6 illustrates a graphical user interface with a visual representation of a single extensible data object, according to one embodiment. As illustrated, each extensible data object may be displayed as a part of a lineage visual representation 610 as icons with connection lines or as part of a timeline visual representation 650. In the lineage visual representation 610, the original document 611 (e.g., the underlying unstructured data element) is the focal point of the extensible data object.

The extensible data object is augmented to further include "orbiting" structured insights that may include version vectors 612 and 618, prepare data versions 613, summaries of data access information 614, shredded information 615, and data science-formatted versions of data 616 and 617. Connection lines represent a relationship between the unstructured data element 611 and the various structured insight features 612-618. In the timeline view 650, the icons representing each of the structured insight features along a timeline to show when it was added to the extensible data object.

Figure 7A:
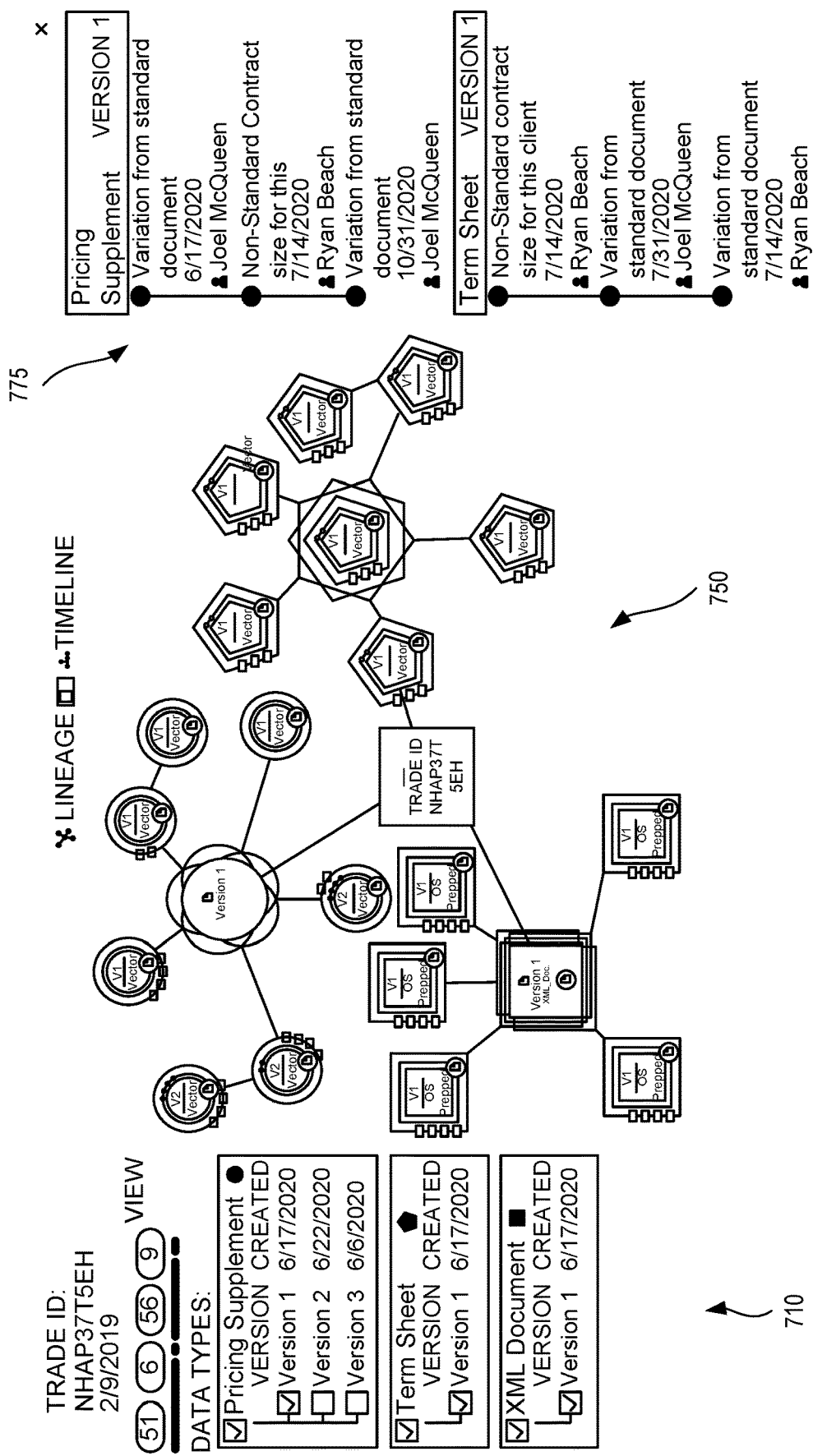
FIG. 7A illustrates a graphical user interface with a visual representation of a select subset of extensible data objects with a first applied filter, according to one embodiment.

FIG. 7A illustrates a graphical user interface with a visual representation of a select subset of extensible data objects with a first applied filter, according to one embodiment. The user selection of a particular subset of data types via the data type selection menu 710 results in the display of a particular selection of extensible data objects and/or various structured insight features within the main lineage view panel 750. An informational history panel 775 may provide selective information regarding changes, updates, access history, and/or other information for displayed or selected extensible data objects and/or the associated structured insight features.

Figure 7B:
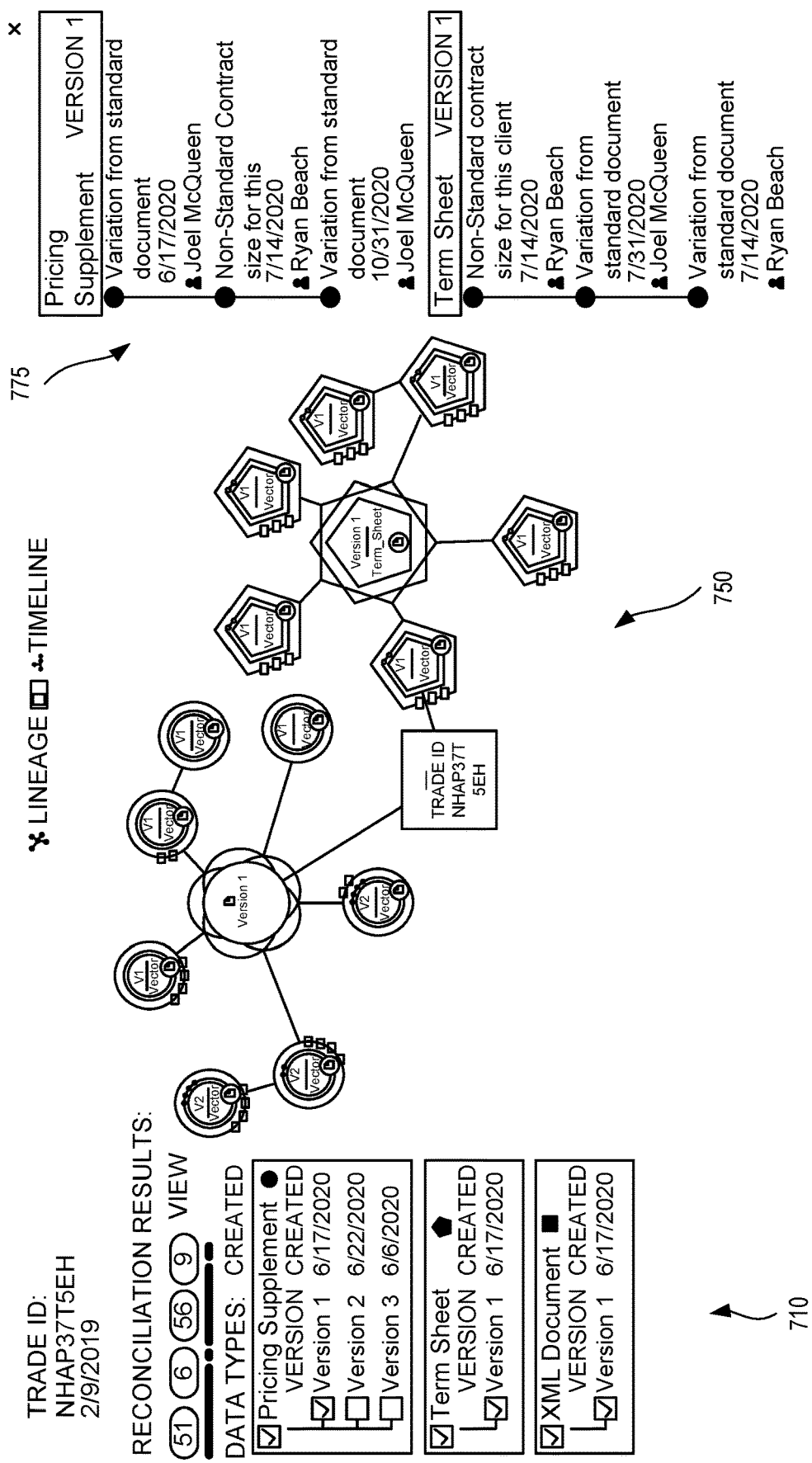
FIG. 7B illustrates the graphical user interface with the visual representation of the select subset of extensible data objects with a second applied filter, according to one embodiment.

FIG. 7B illustrates the graphical user interface of FIG. 7A with the visual representation of the select subset, via the data type selection menu 710, of extensible data objects in the main panel 750 with a second applied filter, according to one embodiment. Changes to the user selection of the data type(s) dynamically modify the displayed extensible data objects and associated structured insight features (including the zoom level) displayed in the main panel 750.

Figure 7C:
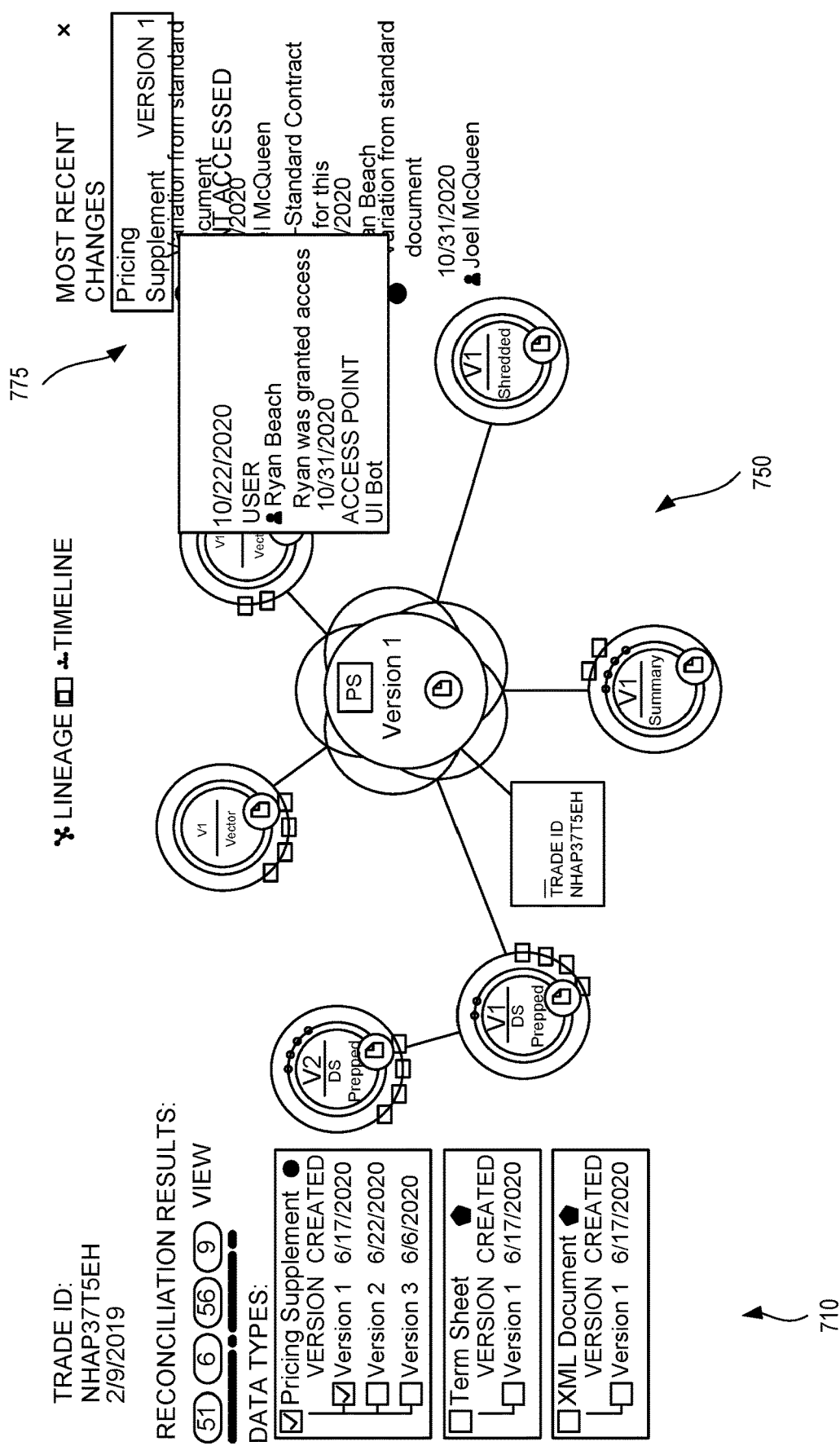
FIG. 7C illustrates the graphical user interface with the visual representation of the single selected extensible data object with the second applied filter, according to one embodiment.

FIG. 7C illustrates the graphical user interface of FIG. 7A with the visual representation of a single selected extensible data object with the second applied filter, according to one embodiment. As illustrated, with the single data type and single version selected via the data type selection menu 710, the main panel 750 shows a zoomed-in view of a single extensible data object with various "orbiting" structured insight features. Overlays available by hovering over an icon or clicking on an icon may provide additional information, history, and/or other options. The information history panel 775 may provide additional or expanded information to utilize the space available to display as much information as possible for the number of icons displayed due to the specific user selection.

Figure 7D:
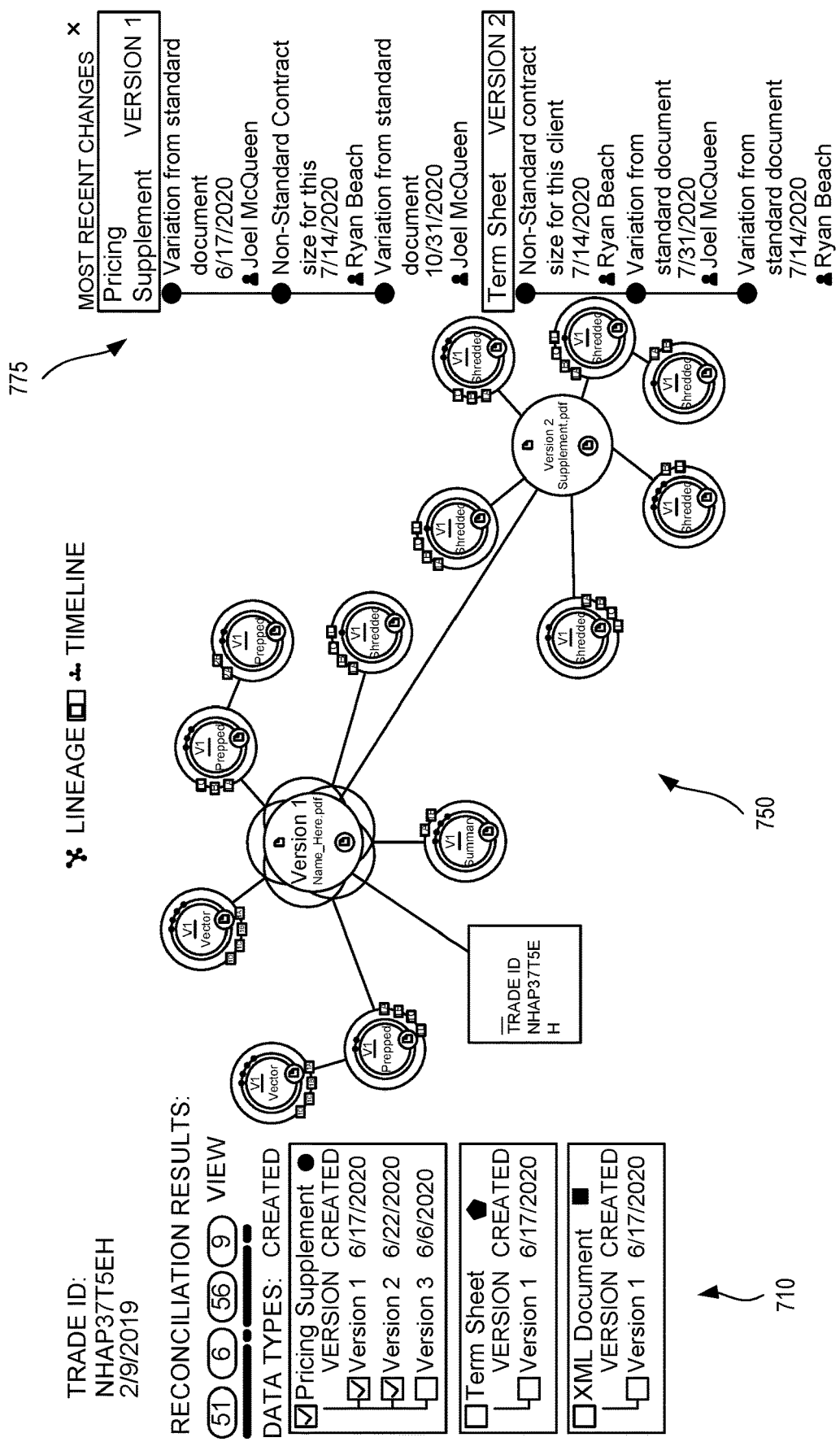
FIG. 7D illustrates the graphical user interface with the visual representation of the single selected extensible data object with a third applied filter to show two versions of the underlying data item, according to one embodiment.

FIG. 7D illustrates the graphical user interface of FIG. 7A with the visual representation of the single selected extensible data object with a third applied filter to show two versions of the underlying data item, according to one embodiment. A connection line between Version 1 and Version 2 of the underlying unstructured data element is displayed in the main panel 750 to represent structured relationship features.

Figure 7E:
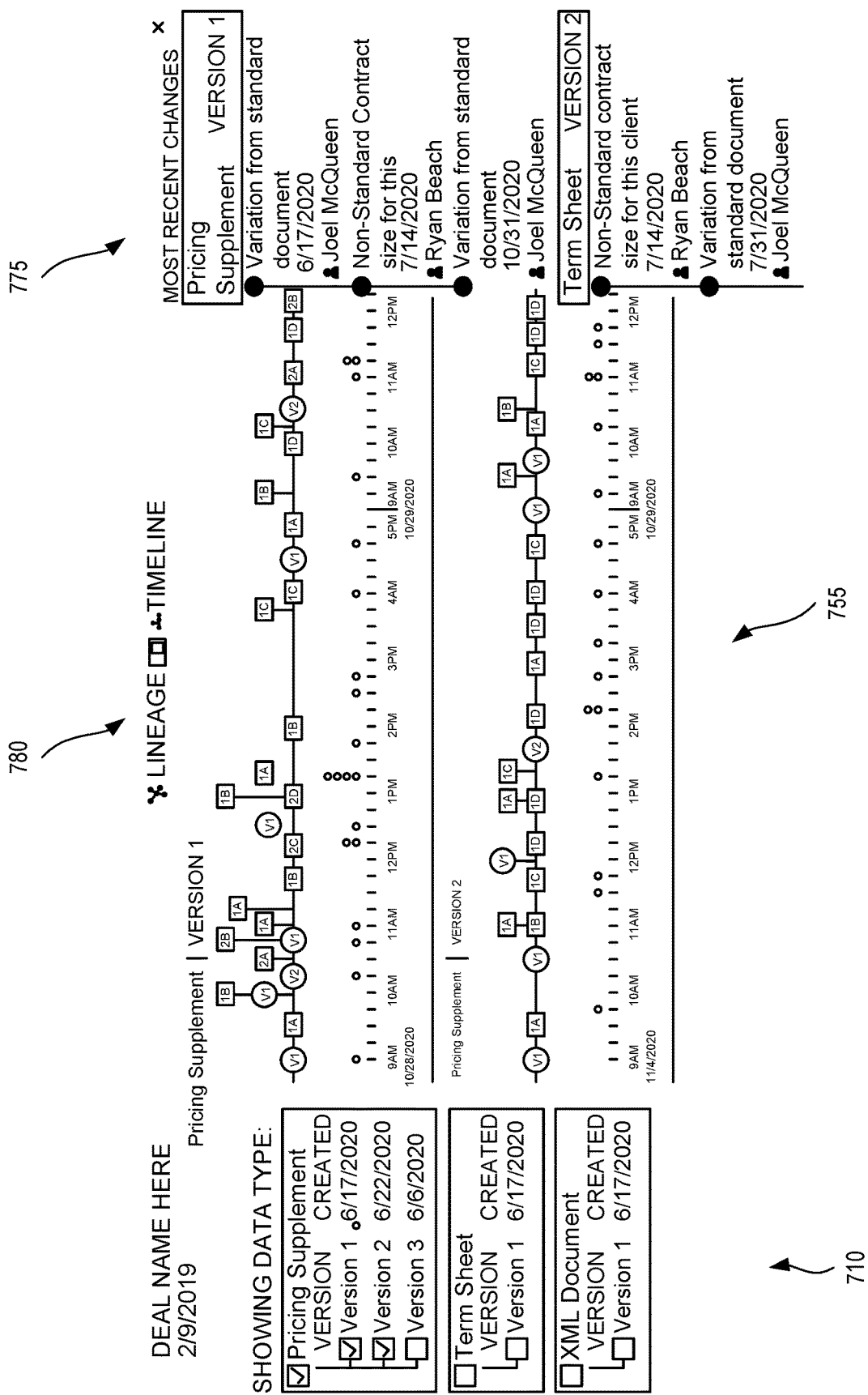
FIG. 7E illustrates a visual timeline representation of the graphical user interface with two versions of the single selected extensible data object, according to one embodiment.

FIG. 7E illustrates a visual timeline representation of the graphical user interface with two versions of the single selected extensible data object, according to one embodiment. As illustrated, a timeline view is selected via a toggle selection menu 780. Timelines are displayed in the main panel 755 for each extensible data object that matches or corresponds to the specific data type and/or version selections made by the user in the data type selection panel 710.

Figure 7F:
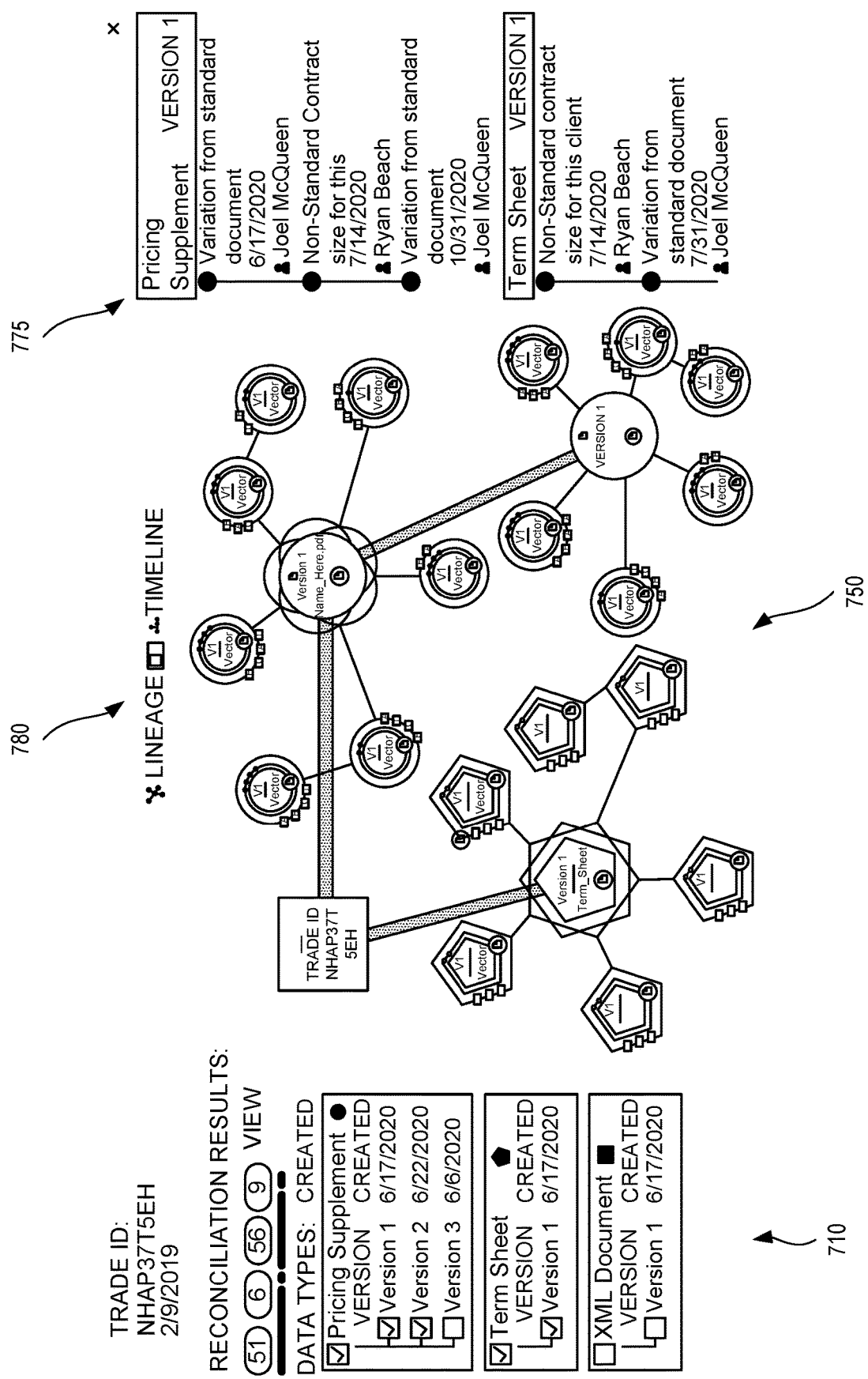
FIG. 7F illustrates the graphical user interface with the visual representation of extensible data objects, including two versions of a pricing supplement, according to one embodiment.

FIG. 7F illustrates the graphical user interface with the visual representation of extensible data objects, including two versions of a pricing supplement, according to one embodiment. In the illustrated example, the connection lines representing the relationships between the extensible data objects are modified to provide visual indications of the reconciliation results between the extensible data objects and/or the underlying unstructured data elements and/or structured insight features. For example, the visual representation may be used to show failed reconciliations between different versions of the data, information identifying when and how new versions were created to allow for successful reconciliation of data within a given dataset.

Figure 8:
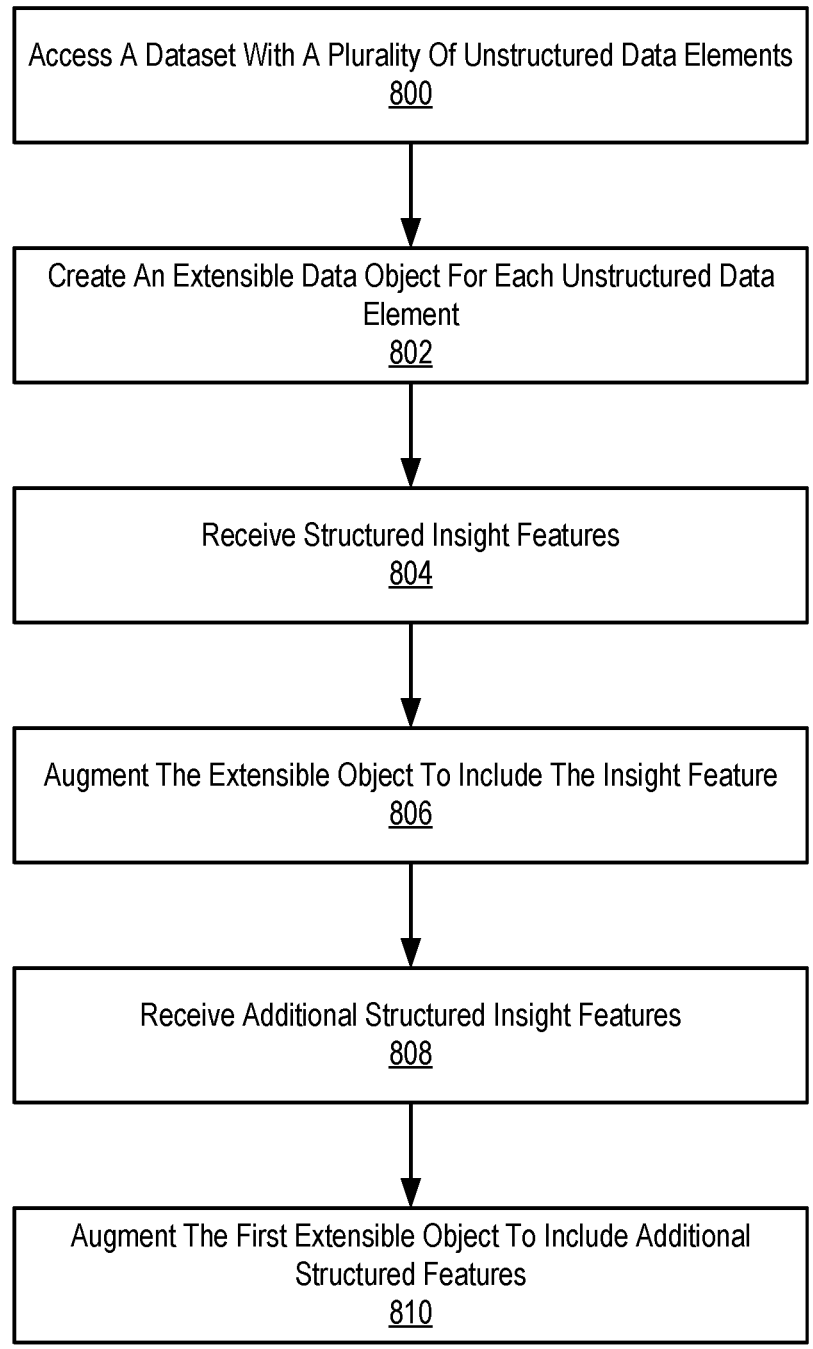
FIG. 8 illustrates the flow chart of a method to generate and augment an extensible data object with received structured insight features, according to one embodiment.

FIG. 8 illustrates the flow chart of a method to generate and augment an extensible data object with received structured insight features, according to one embodiment. A system may access, at 800, a dataset with a plurality of unstructured data elements. The system may create or otherwise generate, at 802, an extensible data object for each of the unstructured data elements. The system may receive, at 804, (e.g., from a first preprocessing subsystem) a first structured insight feature associated with a first unstructured data element of a first extensible data object. The system may augment or otherwise modify, at 806, the first extensible data object to include the first structured insight feature.

The system may receive, at 808, (e.g., from a second preprocessing subsystem) a second structured insight feature associated with the first unstructured data element of the first extensible data object. The system may additionally augment, at 810, the first extensible data object to additionally include the second structured insight feature. As described herein, any number of structured insight features of various types and to serve various purposes may be added or included, along with the underlying unstructured data element, as part of the extensible data object.

Figure 9:
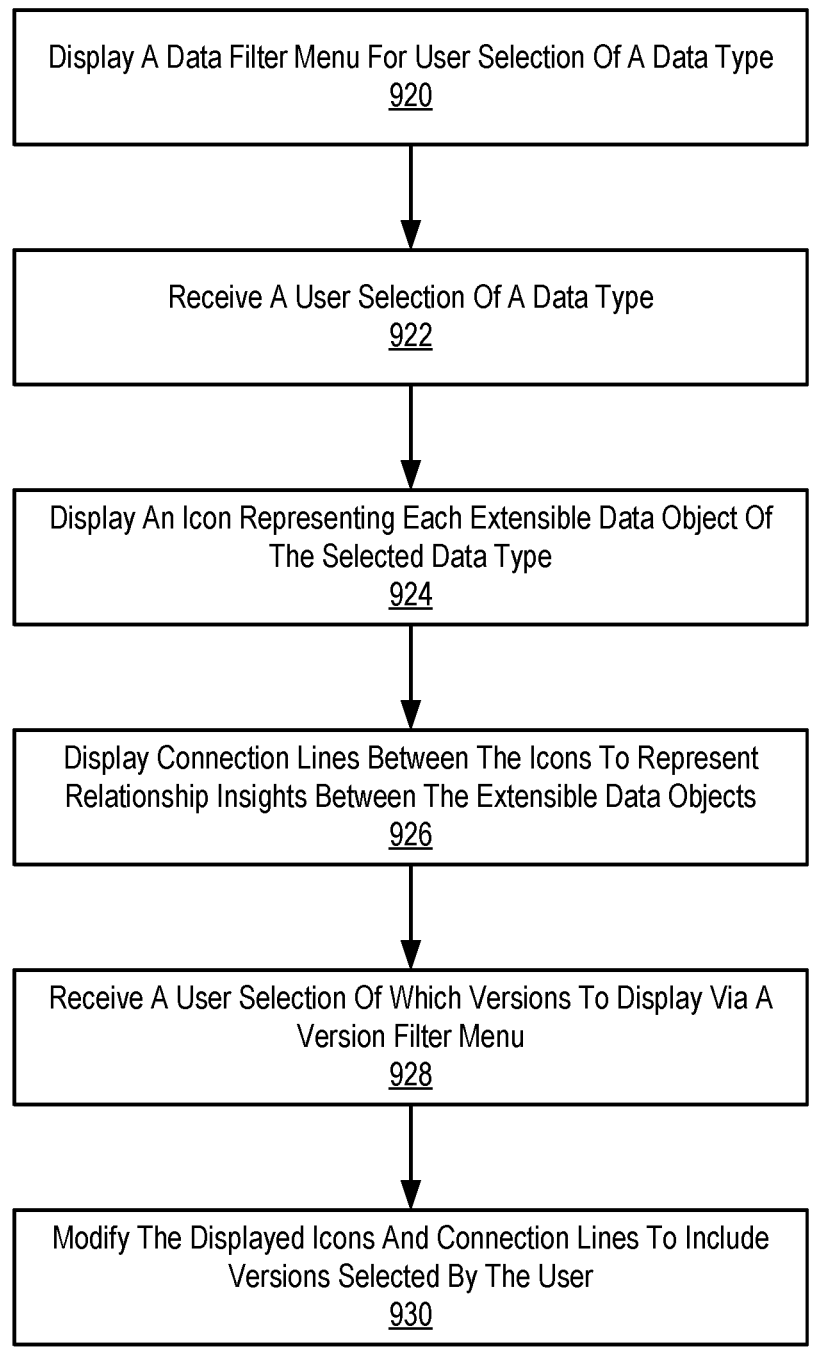
FIG. 9 illustrates the flow chart of a method to generate a user-controlled dynamic display of extensible data objects, according to one embodiment.

FIG. 9 illustrates the flow chart of a method to generate a user-controlled dynamic display of extensible data objects, according to one embodiment. The system may render (e.g., for display on an electronic display of a laptop, computer, mobile device, wearable tech, or another device) a graphical user interface that includes a data type filter menu, at 920, to facilitate a user selection of one or more data types of the plurality of different data types. The system may receive, at 922, a user input selecting a first data type selection of at least one data type of the plurality of different data types via the data type filter menu.

The system may render for display, at 924, an icon representing each extensible data object that has a data type insight feature corresponding to the first data type selection. The system may also render for display, at 926, connection lines between icons to represent the relationship insight features between the unstructured data elements of the extensible data objects represented by the rendered icons having the data type insight feature corresponding to the first data type selection.

The system may also receive, at 928, a user selection of which version(s) of an extensible data object or underlying unstructured data element to display. The system may dynamically modify or otherwise update, at 930, the displayed icons and/or connection lines to include those in the user selection. The system may further include a timeline view, as described and illustrated herein, to display the relative time that each insight feature was added to the extensible data object associated with each displayed icon. The timeline view may further display information identifying at least one person, entity, and/or subsystem that caused each insight feature to be added to each respective extensible data object associated with each displayed icon. In some embodiments, different versions of each respective extensible data object may be displayed on separate timelines.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. Thus, all feasible permutations and combinations of embodiments are contemplated.

Several aspects of the embodiments described may be implemented using hardware, firmware, and/or software modules or components. As used herein, a module or component may include various hardware components, firmware code, and/or any type of computer instruction or computer-executable code located within a memory device and/or transmitted as transitory or non-transitory electronic signals over a system bus or wired or wireless network. Many of the embodiments described herein are shown in block diagram form and/or using logic symbols. It is appreciated that various elements of each of the illustrated and described embodiments could be implemented using FPGAs, custom application-specific integrated circuits (ASICs), and/or as hardware/software combinations.

In the description above, various features are sometimes grouped in a single embodiment, figure, or description thereof to streamline this disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure also includes all permutations and combinations of the independent claims with their dependent claims.

What is claimed is:

1. A method, comprising:
    accessing a dataset with a plurality of unstructured documents;
    creating an extensible data object for each of the unstructured documents;
    receiving, from a first preprocessing subsystem, a first structured insight feature associated with a first unstructured document of a first extensible data object;
    augmenting the first extensible data object to include the first structured insight feature;
    receiving, from a second preprocessing subsystem, a second structured insight feature associated with the first unstructured document of the first extensible data object;
    augmenting the first extensible data object to include the second structured insight feature, such that the first extensible data object includes at least two structured insight features;
    receiving, via at least a third preprocessing subsystem:
        a third structured insight feature that characterizes a relationship between the first unstructured document and a second unstructured document of a second extensible data object, and
        a fourth structured insight feature that characterizes a relationship between the first unstructured document and a third unstructured document of a third extensible data object;
    augmenting the first extensible data object to include the third and fourth structured insight features characterizing the relationships of the first unstructured document to the second and third unstructured documents, respectively,
    such that the first extensible data object includes at least four structured insight features associated with the first unstructured document;
    augmenting the second extensible data object associated with the second unstructured data element to include the third structured insight feature;
    augmenting the third extensible data object associated with the third unstructured data element to include the fourth structured insight feature;
    rendering, for display on an electronic display, a view menu as part of a graphical user interface to facilitate user toggling between a lineage view and a timeline view of the first, second, and third extensible data objects;
    receiving, via user input, a selection of the timeline view; and
    rendering, for display via the electronic display, in response to the user selection of the timeline view:
        (i) icons in orbit rings around at least some of the extensible data objects to visually represent earlier versions thereof, and, simultaneously,
        (ii) a timeline that shows the relative time of creation of each version of at least one extensible data object.

2. The method of claim 1, wherein at least some of the unstructured documents comprise contract documents.

3. The method of claim 1, wherein the first structured insight feature comprises a structured, machine-readable version of the first unstructured document.

4. The method of claim 3, wherein the second structured insight feature comprises a document categorization identifying a document type of the first unstructured document.

5. The method of claim 3, wherein the second structured insight feature comprises one of: a computer-readable version of the first unstructured document, an attribute of the first unstructured document, a subject matter expert insight provided with respect to the first unstructured document, a characteristic of the first unstructured document, a relationship between the first unstructured document and another of the unstructured document, and a language translation of the first unstructured document.

6. A visualization method, comprising:
    accessing a database with a plurality of extensible data objects, wherein each extensible data object comprises:
        an unstructured document from an unstructured dataset of documents, a data type insight feature that identifies each respective extensible data object as having one of a plurality of different data types, at least one of which data types comprises a contract data type, a relationship insight feature that identifies a relationship of the unstructured document with an unstructured document of at least one other extensible data object, and at least one additional insight feature associated with the unstructured document identified by a data preprocessing subsystem, wherein at least one of the extensible data objects includes a relationship insight feature that identifies a relationship of the unstructured document with unstructured documents of at least three other extensible data objects;

rendering, for display on an electronic display, a graphical user interface that includes a data type filter menu to facilitate a user selection of one or more data types of the plurality of different data types;

receiving, via a user input, a first data type selection of a contract data type of the plurality of different data types via the data type filter menu;

rendering, for display via the electronic display, the graphical user interface with:

an icon representing each extensible data object that has a data type insight feature corresponding to the selected contract data type, and connection lines between icons to represent the relationship insight features between the unstructured documents of the extensible data objects represented by the rendered icons having the data type insight feature corresponding to the selected contract data type;

rendering, for display on the electronic display, a view menu as part of the graphical user interface to facilitate user toggling between a lineage view and a timeline view of the extensible data objects;

receiving, via user input, a selection of the timeline view; and rendering, for display via the electronic display, in response to the user selection of the timeline view:

(i) icons in orbit rings around at least some of the extensible data objects to visually represent earlier versions thereof, and (ii) a timeline that shows the relative time of creation of each version of at least one extensible data object, wherein versions of each respective rendered extensible data object are displayed on separate timelines within a primary panel of the graphical user interface.

7. The visualization method of claim 6, further comprising:

receiving, via an additional user input, a second data type selection of a different data type of the plurality of data types via the data type filter menu; and rendering, for display via the electronic display, an updated graphical user interface with:

an updated set of icons representing the extensible data objects that have data type insight features corresponding to the second data type selection, and updated connection lines between icons representing the relationship insight features between the unstructured documents of the extensible data objects represented by the rendered icons having the data type insight feature corresponding to the second data type selection.

8. The visualization method of claim 6, further comprising:

rendering for display on the electronic display, a version filter menu as part of the graphical user interface to facilitate a user selection of one or more versions for each extensible data object displayed as an icon;

receiving, via an additional user input, a first version selection of at least one version of a plurality of available versions for each extensible data object displayed as an icon; and rendering, for display via the electronic display, the graphical user interface with:

an updated set of icons representing the extensible data objects that have data type insight features corresponding to:

the first data type selection, and the first version selection; and updated connection lines between the updated set of icons.

9. The visualization method of claim 6, wherein the timeline view further displays the relative time that each insight feature was added to the extensible data object associated with each displayed icon.

10. The visualization method of claim 9, wherein the timeline view further displays information identifying at least one of a person, entity, or subsystem that caused each insight feature to be added to each respective extensible data object associated with each displayed icon.

* * * * *